United States Patent [19]

Hanna et al.

[11] Patent Number: 5,017,837
[45] Date of Patent: May 21, 1991

[54] INDICATOR LAMP SYSTEM

[75] Inventors: R. Scott Hanna, Bethlehem, Pa.;
Woodie Flowers, Weston, Mass.;
David G. Luchaco, Macungie, Pa.;
Stephen J. Yuhasz, Zionsville, Pa.;
Joel S. Spira, Coopersburg, Pa.;
Philip R. Hall, Ottsville, Pa.

[73] Assignee: Lutron Electronics Co., Inc., Coopersburg, Pa.

[21] Appl. No.: 453,093

[22] Filed: Dec. 12, 1989

Related U.S. Application Data

[63] Continuation of Ser. No. 131,776, Dec. 11, 1987, abandoned, which is a continuation-in-part of Ser. No. 78,846, Jul. 30, 1987, abandoned.

[51] Int. Cl.$^5$ .................. H01J 70/42; G05B 23/02
[52] U.S. Cl. ................................ 315/136; 315/119; 315/135; 340/825.17
[58] Field of Search ............ 340/825.17, 825.72, 340/825.77, 331, 332, 815.01, 815.03, 310 A; 315/129, 131, 134, 136, 159, 120, 119, 125, 135; 307/157; 455/343

[56] References Cited

U.S. PATENT DOCUMENTS

| | | | |
|---|---|---|---|
| 2,970,303 | 1/1961 | Williams | 315/129 |
| 3,119,046 | 1/1964 | Usher | 315/129 |
| 3,388,293 | 6/1968 | Petschauer | 315/129 |
| 3,518,485 | 6/1970 | Leathem | 315/129 |
| 3,873,979 | 3/1975 | Craford et al. | 340/815.01 |
| 4,038,582 | 7/1977 | Horwinski | 315/129 |
| 4,163,218 | 7/1979 | Wu | 340/310 A |
| 4,200,862 | 4/1980 | Campbell et al. | 340/310 A |
| 4,317,987 | 3/1982 | Fieldman | 340/825.17 |
| 4,324,986 | 4/1982 | Hara et al. | 307/157 |
| 4,556,863 | 12/1985 | Devitt et al. | 340/331 |

FOREIGN PATENT DOCUMENTS

| | | | |
|---|---|---|---|
| 0159689 | 12/1980 | Japan | 340/825.17 |
| 0188937 | 11/1983 | Japan | 455/343 |

Primary Examiner—Eugene R. LaRoche
Assistant Examiner—Ali Neyzaki

[57] ABSTRACT

An indicator lamp indicates the status of an electrically-powered load control system by providing dim light when the load power is off and a brighter light when the load power is on. In another embodiment, the lamp not only provides two levels of light to indicate whether or not power is on, but also provides a repetitive flash when power to the system is being controlled by remote control. The indicator lamp can also indicate a break in the load circuit. Depending on the embodiment, the break can cause the lamp to be either off or flashing, regardless of the position of the load power switch. Alternatively, a break in the load circuit can cause the lamp to provide substantially no light if the load power switch is in the "off" position, with full light in the "on" position.

26 Claims, 6 Drawing Sheets

INDICATOR LAMP SYSTEM

CROSS REFERENCE TO RELATED APPLICATIONS

This application is a continuation of application Ser. No. 131,776, filed 12-11-87 now abandoned, which is a continuation-in-part of copending U.S. Appl. Ser. No. 079,846, filed July 30, 1987.

BACKGROUND OF THE INVENTION

1. Field of the Invention

This invention relates to a lamp that indicates the status of an electrically-powered load control system and that, more particularly, indicates whether the power is off or on and whether the system is receiving a control signal.

2. Description of the Related Art

It is generally important to know whether or not power is being provided to a controlled electrical load, and pilot lamps have long been used for that purpose. Indicator lamps that provide additional information have also been disclosed.

U.S. Pat. No. 3,873,979, issued Mar. 25, 1975, to M. G. Craford et al., discloses a luminescent indicator that employs two solid state devices which emit different colors of light. The colors indicate the (changing) status of a condition being monitored. In different embodiments, the color change is either discrete—only one device on at any time—or continuous—with a gradual color change corresponding to the changing condition. In another embodiment, the change in status can cause the two lamps (which may be the same color) to flash alternately rather than be on continuously.

U.S. Pat. No. 4,388,589, issued June 14, 1983, to B. P. Molldren, Jr., discloses a system that includes a plurality of lamps of different colors. The system is designed so that a DC level is represented by a color. As the level changes the color changes.

U.S. Pat. No. 4,678,925, issued July 7, 1987, to D. Grocke, discloses an illuminating system for a motor vehicle that provides dim dashboard illumination when the vehicle's headlamps are on low beam and bright dashboard illumination when the headlamps are on high beam.

Remotely controlled electrical devices are well known, and wireless television controllers are quite common. In a remotely-controlled TV sold under the MGA label, an indicator lamp blinks when the TV is being remotely controlled, such as when the volume is being raised or lowered or the channels are being scanned.

SUMMARY OF THE INVENTION

In accordance with the present invention, an indicator lamp, for use with an electrical load power-control means, emits a low light intensity when the load power is off and a higher light intensity when the load power is on.

In another embodiment, for use with an electrical load power-control means that is controlled by a control signal, an indicator lamp emits
  (a) a low light intensity when the load power is off,
  (b) a higher light intensity when the load power is on, and
  (c) a repetitive light flash while the control signal is being detected.

The indicator lamp of the present invention may be a part of a lighting control system that comprises
  (a) means for controlling power to a lighting load and
  (b) an indicator lamp that emits a low light intensity when power to the load is off and a higher light intensity when power to the load is on.

The indicator lamp of this invention serves up to three functions. When power to the load is off, the lamp emits a low light intensity, which can act as a night light for locating a load-control station. When power to the load is on, the lamp acts as a pilot lamp. When power to a load is to be controlled by a control signal, the lamp flashes to show that the signal is being received.

DETAILED DESCRIPTION OF THE INVENTION

For use with an electrical power control system, the present invention provides an indicator lamp that has either two or three modes of operation. In the first mode of operation, the lamp emits a low light intensity when power to the controlled load is off. For this mode, the light is preferably bright enough to be visible in a typical darkened room; for example, in a residence. Brightness (or luminance) in the range between about 0.02 and about 2 footlamberts (measured perpendicular to the surface of the light source) is particularly preferred. If the intensity is too high, there can be confusion between the first mode and the second mode, in which the lamp emits a higher light intensity when the power to the controlled load is on. In this mode, the indicator lamp luminance is preferably at least about 100 footlamberts. The ratio of luminance provided by the second (power "on") mode to the first mode should be as large as possible, within the constraint that the low light must be visible in a darkened room and the higher light need merely be visible clearly in a lighted room. A combination of low-light luminance of 0.5 fL and high-light luminance of 400 fL is very satisfactory.

A third mode of lamp operation may apply when the indicator lamp is an element of an electrical power control system that is controlled remotely by a control signal. In that case, in addition to the first two modes of operation, the lamp flashes repeatedly while the signal is being detected. In a preferred embodiment, the control signal is a radiated signal. The flash repetition frequency is not critical, but a frequency in the range between about 2 and about 10 Hz is preferred, because these frequencies are easily achieved and readily perceived.

The present invention embraces lighting control systems that include an indicator lamp of the type described above. Such a system may include one or more switches. A pilot light at a lighting control switch serves little function if the status of the controlled system is apparent to a person at the switch, either because the lighting is visible from the switch or because the switch position (e.g., up or down) indicates the status. However, a pilot light becomes more useful in three-way lighting systems, where at least one control switch is remote from the controlled light. An indicator lamp at a remote switch location permits a person at that location to know the status of the controlled lighting, even if the lighting is neither visible from the switch location nor apparent from the switch position. An indicator lamp on a control switch in the same room as the controlled lighting provides a low light level if the power is off, thus making the switch visible even if the room is otherwise totally dark.

As desired, the light emitted by the indicator lamp can be diffused—for example, by placing in the light path a dispersion of glass powder in epoxy or a window of sandblasted plastic—or can be collimated—for example, by passing the light through a light pipe or an optical fiber. To increase the viewing angle, the light pipe or optical fiber may have a rounded or beveled end.

Figure 1:
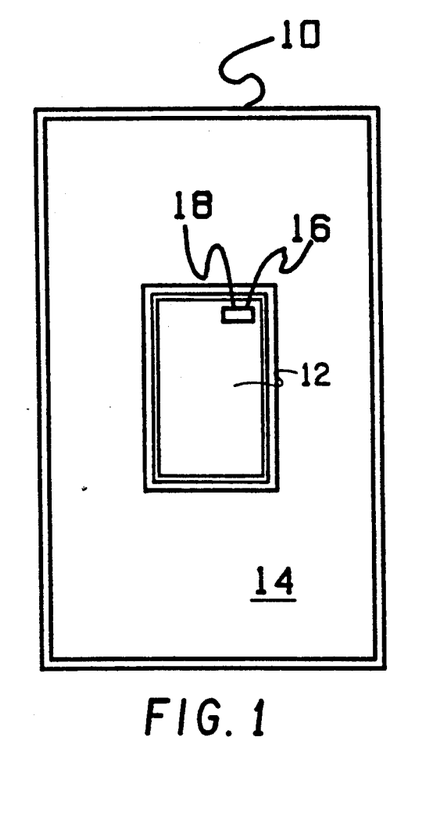
FIGS. 1-3 depict three alternative embodiments of the indicator lamp of the present invention.

Any color indicator lamp may be used, but orange light (maximum emission between about 580 and 650 nm) is preferred, because it is easily seen and is not commonly associated with either "on" or "off." A light emitting diode (LED) provides a convenient source for an indicator lamp. Typically, if an indicator lamp is associated with a control switch, it is convenient to mount the lamp so that its light is emitted through a hole in the switch support plate. Alternatively, if the switch is a momentary contact ("touch") switch, the light may be emitted through the touch plate. This is illustrated in FIG. 1, which depicts touch switch 10, including touch plate 12 within support plate 14. Indicator lamp 16 emits light through a window, having beveled edges 18, in touch plate 12. A system may include more than one control switch, each with an indicator lamp.

A lighting control system of the present invention may include a dimmer, which controls the power to a lighting load in accordance with the position of an actuator. Preferably, the actuator includes a slider of a linear slide potentiometer. Lighting control systems that include such a dimmer and remote switches are disclosed in U.S. Pat. No. 4,563,592, issued Jan. 7, 1986, to Yuhasz et al.

Figure 2:
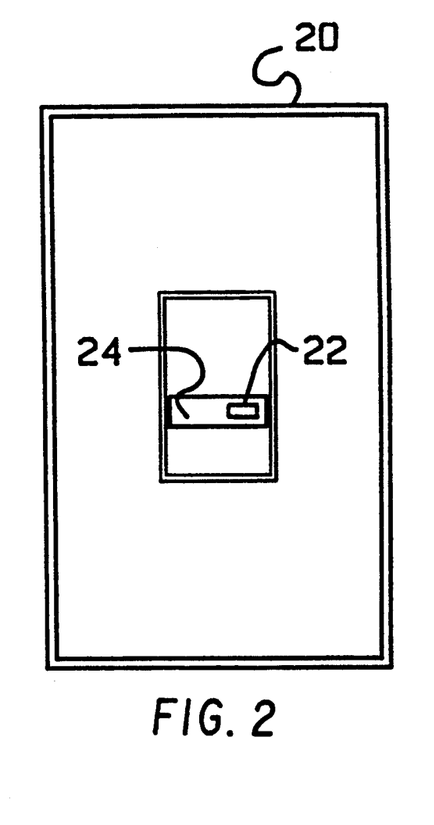

For purposes of the present invention, an actuator may be configured so that the light from the indicator lamp is emitted through the actuator. This configuration is shown in FIG. 2, which depicts linear slide dimmer 20. Indicator lamp 22 (optionally covered by a window) emits light through actuator 24.

Figure 3:
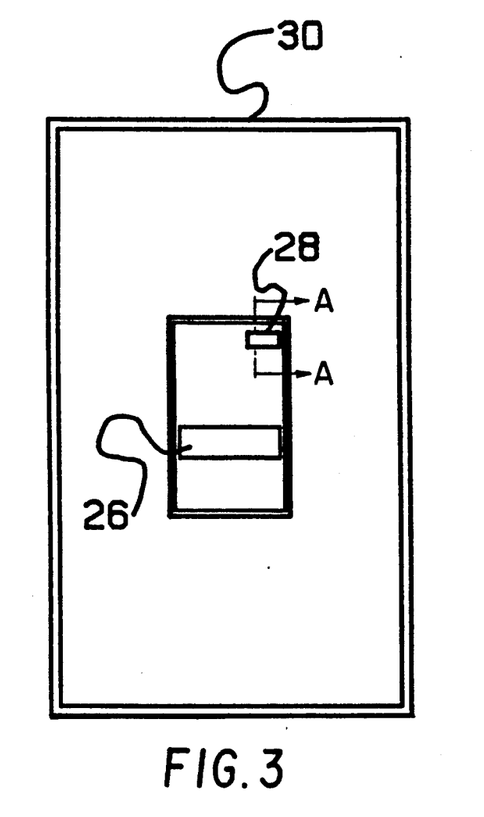

A control system of the present invention may also include remote control; e.g., of the type disclosed in U.S. patent application Ser. No. 079,847, filed July 30, 1987, entitled "Wireless Control System," now abandoned and incorporated by reference. A remote signal controls the power to a load, which may, for example, be a lighting load. The signal may be an electrical signal carried by a conductor, an electromagnetic signal—e.g., visible light, infrared, microwave, etc.—or a non-electromagnetic signal, such as ultrasonic. In any case, the signal is detected by an appropriate detector, which provides an output in response to the remote control signal. While the detector is detecting a remote control signal, the indicator lamp flashes to confirm that the control signal is being received. The remotely controlled lighting control system may include a switch and/or a dimmer. The indicator lamp is preferably mounted near the detector; e.g., on the ceiling or a wall of a room in which the control system is located. FIG. 3 depicts a detector 26 and indicator lamp 28 in a combination unit 30 that is adapted for wall mounting.

Figure 3A:
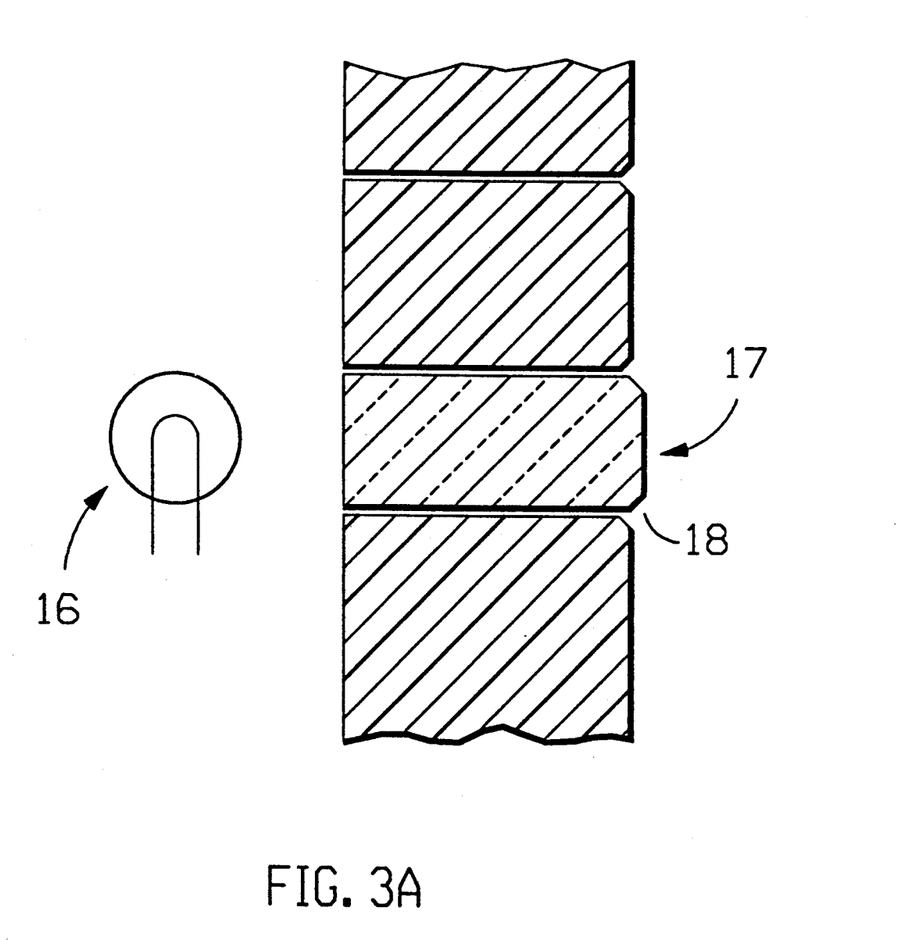
FIG. 3A depicts a sectional view taken along line A—A of FIG. 3.

FIG. 3A shows a section taken along line A—A of FIG. 3. Indicator lamp 16 emits light that passes through window 17, which is optionally, as shown, a light pipe that produces a collimated beam. Optionally, as shown, window 17 has beveled edges 18. It is sometimes desirable to diffuse the emitted light. If so, that can be accomplished, for example, by having some or all of window 17 comprise a dispersion of glass powder in epoxy or by sandblasting the front of the window.

Figure 4:
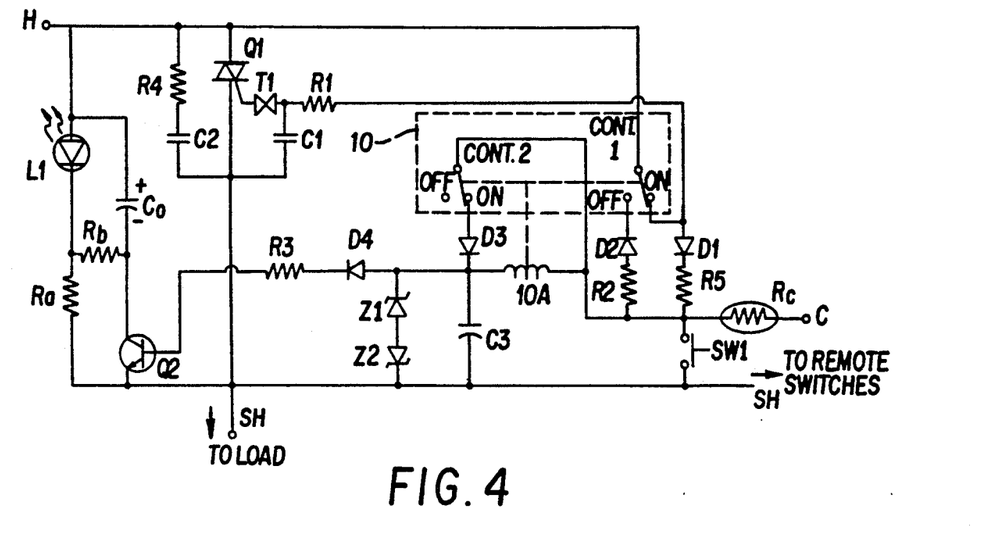
FIG. 4 depicts a circuit to provide a night light/pilot light of the present invention.

FIG. 4 depicts a circuit to provide the two-mode (night light/pilot light) embodiment of the present invention. When two-pole latching relay 10 is switched on, C1 is charged with a time constant R1C1. When the voltage across C1 reaches the breakover voltage of diac T1 (typically ~30 V), current flows from C1 to fire triac Q1. Q1 is then on until the end of the half cycle, during which load current flows from hot (H) to switched hot (SH) and then through the load. Typically, Q1 fires about 600 μs, or less, after relay 10 is switched on. Optional components C2 and R4 comprise a snubber to protect Q1.

With relay 10 on, bipolar capacitor C3 is also charged, through D1, R5 and D3. Little current passes through high-resistance relay coil 10A of relay 10. Zener diode Z1 regulates the voltage on C3 (typically ~20 V). With C3 charged, pushing momentary switch SW1 causes C3 to discharge through relay coil 10A, causing relay 10 to toggle off. C3 then charges with the opposite polarity through relay coil 10A, R2, and D2, with Zener diode Z2 regulating the voltage (to ~20 V). When relay coil 10 toggles off, at the next load current zero crossing, power is removed from R1, and triac Q1 turns off. If SW1 is again pushed, C3 discharges through relay coil 10A, which causes relay 10 to toggle on, returning the system to the original position. Rc is an optional positive-temperature-coefficient (PTC) resistor to protect against miswiring.

The indicator lamp of this invention is depicted in FIG. 4 as LED L1. When power to the load is off, Q1 and Q2 are off and line voltage is applied to L1 through Ra. Typically, Ra is about 240 kΩ, to provide about 0.5 mA through L1 for the "night light" mode. When power to the load is on, current is provided to the base of transistor Q2 through D4 and R3, turning Q2 on and putting Ra and Rb in parallel. Typically, Rb is about 100Ω to provide ~15 mA through L1 for the "pilot light" mode. For test purposes while adjusting light levels, Ra and Rb are variable; once the desired levels are determined, the resistors needn't be variable. $C_o$ is a smoothing capacitor and storage element to limit peak current and to smooth the current input to L1. If there is a break—i.e., an open circuit—in the load, then no current is provided to L1 and the lamp is off, regardless of the position of SW1 and any remote switches.

Figure 5:
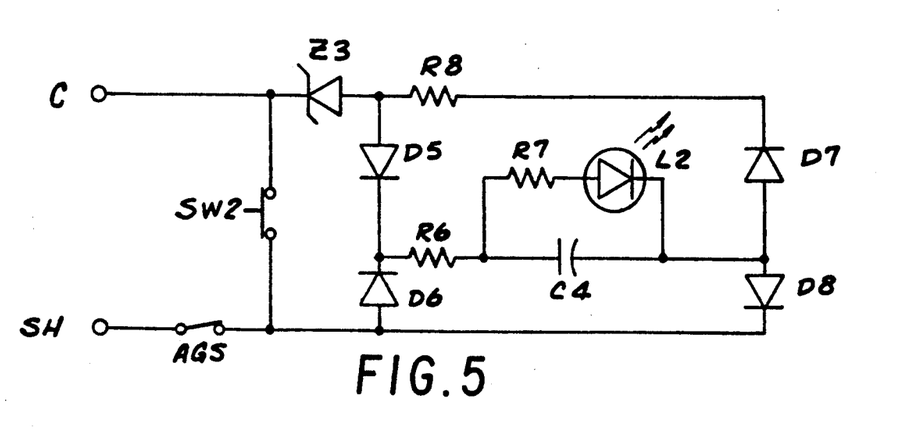
FIGS. 5-7 depict three alternative embodiments of circuits for remote switches and indicator lamps.
Figure 6:
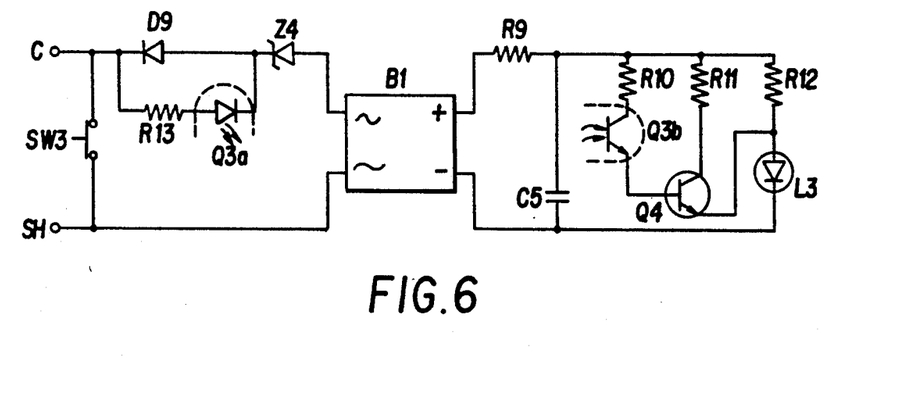
Figure 7:
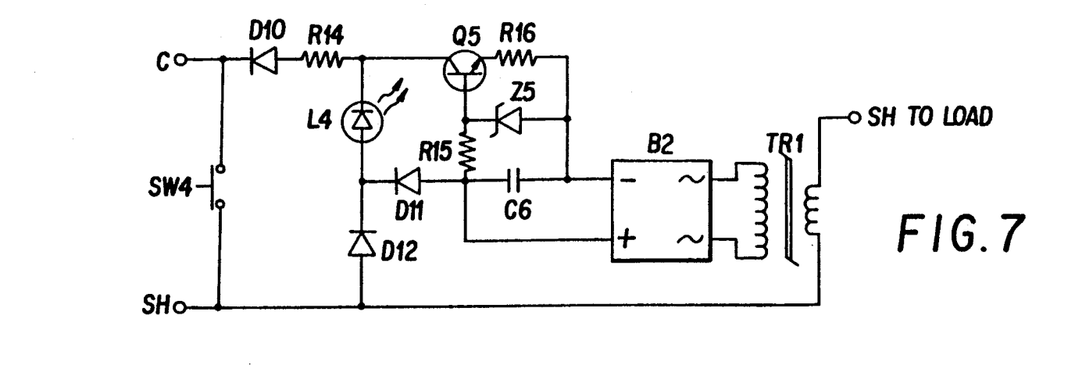

Since FIGS. 5–7 depict alternative additions to the circuit of FIG. 4 (at C and SH at the lower right of FIG. 4), elements of FIG. 4 are referred to, as necessary, in the description of FIGS. 5–7, below.

FIG. 5 depicts a circuit for a remote switch and indicator lamp. With power to the load off, SH is at a positive potential (20 V) with respect to control (C), provided by C3. Current flows through D6, R6, R7, L2, D7, R8, and Z3 back to C. Typically, R8 is ~47 kΩ to provide 0.5 mA through L2 in the night-light mode. C4 is a smoothing capacitor that prevents current spikes from affecting L2. Momentary switch SW2, in parallel with switch SW1 in the main unit, is pushed to toggle the system on.

In the "on" state, C is at a positive voltage (20 V) and Z3 prevents C3 from discharging. During the time when line voltage is between about 20 V and 30 V, current flows through D5, R6, R7, L2, and D8 back to SH. Capacitor C4 is charged through R6 and ensures that current flows through L2 throughout the cycle. Resistors R6 and R7 are selected to provide ~15 mA through L2 in the pilot light mode. Optional air gap switch AGS can be opened to remove power from the remote switch circuit. For clarity and simplicity, AGS is not shown in the figures showing alternative embodiments of remote switch circuits.

FIG. 6 depicts an alternative embodiment for a remote switch-indicator lamp circuit. In the power off-night light mode, SH is positive and current flows through bridge B1, R9, R12, L3, B1, Z4, and D9 to C. R12 is typically ~47 kΩ (much greater than R9) to provide ~0.5 mA through L3. Switch SW3 toggles the power on. In the power on-pilot light mode, Z4 prevents C3 from discharging, and current flows through R13 and the opto-coupler LED Q3A to turn on Q3B, thereby producing base current to transistor Q4. Q4 turns on and R11 and R12 are placed in parallel. R11 is typically ~470Ω to provide ~15 mA to L3. C5 and R9 are used to store charge to be fed to L3 over the balance of the cycle. R13 and R10 limit the current through opto-transistor elements Q3A and Q3B, respectively.

FIG. 7 depicts the preferred embodiment of a remote switch-indicator lamp circuit. This embodiment is preferred, because power is provided from the load current in the "power on" state. The other embodiments depend on power stored in a capacitor during the part of the cycle when triac Q1 is conducting. Typically, Q1 is conducting for most of the cycle; i.e., all but 600 μs. In the off state, current flows from SH through D12, L4, R14, and D10 to C. If R14 ~47 kΩ, ~0.5 mA flow through L4. If S4 is pushed to turn the system on, load current through the primary of transformer TR1 induces current in the secondary, which flows through bridge B2 to charge capacitor C6. R15, Z5, Q5, and R16 are a constant current source for L4. R15 limits the current through Z5. Typically, when there is current to the load, Z5 is at ~3 V and ~2.4 V are across R16 (~160Ω) to provide ~15 mA through L4. D11 prevents current leaking into the current source circuit during the off state.

Figure 8:
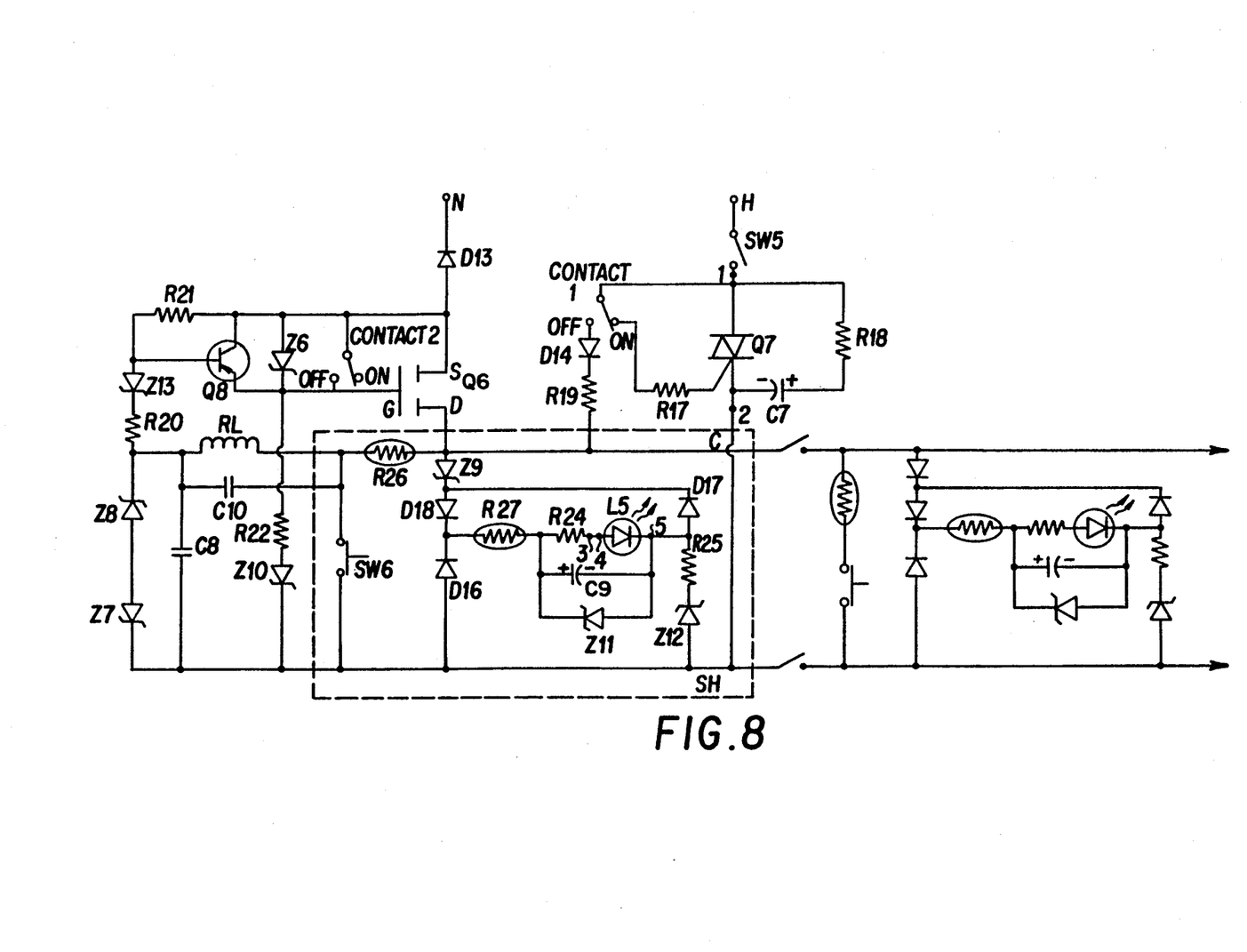
FIG. 8 depicts an alternative to the circuit of FIG. 4.

FIG. 8 depicts an alternative embodiment of the circuit of FIG. 4, including a neutral line. With switch SW5 (an optional air-gap switch) closed, when Hot (H) is switched to R17 by relay contact 1, current can flow into the gate of Q7, and Q7 turns on. Q7 is an electrically controlled switch, preferably a triac. Optional snubber components R18 and C7 filter transient signals and prevent misfiring of Q7. With Q7 on, load current can flow from H to Switched Hot (SH) and to the Load. Q7 remains on until the end of the half-cycle. It is turned on again during the next half-cycle.

With Q7 on, the SH potential rises. After SH reaches a predetermined value (the breakover voltage of Z10 —typically about 27 V), current flows through Z10 and R22 to produce a voltage across the gate-source of controllably conductive device Q6, which is preferably an IGT or FET. When the gate-source voltage reaches a predetermined value (typically about 2.5 V), Q6 turns on and allows current to flow to Neutral (N) through diode D13. Z6 limits the gate-source voltage to a predetermined value (typically 9 V). With Q6 on, C8 charges through relay coil RL to Neutral potential. When the voltage across the series combination of R26, RL, and 08 reaches a predetermined value (typically about 54 V), Z13 begins to regulate. Current flows to turn on transistor Q8, which, in turn, shorts the gate and source of Q6, turning Q6 off. Q6 remains off until SH falls below about 54 V, at which time Q6 turns on again. Resistor R20 limits the current through Z13. Optional pull-down resistor R21 ensures that Q8 doesn't turn on until Z13 breaks over. The process of turning on Q6 and charging C8 occurs during every positive half-cycle of line voltage.

Once C8 is charged to a predetermined voltage (typically about 27 V), if momentary switch SW6 is depressed, C8 discharges through relay coil RL to toggle and latch relay contacts 1 and 2 in the "off" position. Gate current is no longer provided to 07 and it turns off at the end of the half-cycle. C8 charges with polarity opposite to that for the "on" state. Current flows through D14, R19, R26, RL, and C8 to SH (which is effectively at N, since Q7 is off). C8 charges until the voltage across it reaches a predetermined value (typically about 22 V) determined and maintained by Z8. If SW6 is now depressed, C8 discharges through RL to toggle and latch the relay contacts to the "on" state. Optional snubber capacitor C10 may be used to eliminate any acoustic noise from the relay.

When switching from "off" to "on", if switch SW6 is held in the depressed state (for more than one cycle), Q6 is held in the off state. This is accomplished by current flowing through SW6, RL, R20, and Z13 to Q8, turning Q8 on when the voltage exceeds a predetermined value established by Z13 (typically about 27 V). At the same time, current flows through Z10 and R22 to the gate of Q6 when the line is above 27 V. Q6 would turn on if the line were to rise above 27 V+gate-source threshold voltage (about 30 V). However, Q8 turns on first, ensuring that Q6 remains off. The same process operates to keep Q6 off in case H is miswired to the control line (C).

Indicator lamp L5 operates as follows: In the "on" state (Q7 on), when Q6 is on and the voltage between SH and C is above a predetermined voltage (typically about 20 V), current flows through D16, R27, C9, D17, Z9, Q6, and D13 to N. C9 charges to a voltage regulated by Z11 (typically about 12 V). This voltage is used to provide current (typically about 15 mA) through R24 and L5, causing L5, which is preferably a light-emitting diode, to emit a high intensity light. Z9 prevents the discharge of C8. R27, typically a 22Ω PTC, protects the LED circuit from miswires.

If the system is toggled to the "off" state, and Q7 is off, SH is effectively at N and current flows from H to D14, R19, Z9, D18, R27, R24, L5, R25, and Z12 to SH. The current through L5 is typically about 0.5 mA, set by the value of R25, and the LED emits a lower light intensity. The elements within the dashed lines are duplicated in the "LED REMOTE" section to constitute an additional switch and associated indicator lamp to function—typically in a location remote from the rest of the circuitry—in place of SW6, L5, and their associated components. Additional LED REMOTE sections may be used, as well. Each remote section is optionally separated from the remainder of the circuit by an air-gap switch. All lamps are bright, dim, or off in unison.

The circuit of FIG. 8 alerts a user when there is a break in the load circuit (for example, if the load is a lamp, when the lamp is burned out). In that case, lamp L5 emits substantially no light when the system is in the "off" state. An alternative embodiment provides a repetitive light flash regardless of whether the system is on or off. The flashing embodiment is accomplished by providing three devices. First, a circuit across the electrically-controlled switch Q7, at points 1 and 2, turns on the emitter of an optocoupler for any non-zero potential between 1 and 2 and turns off the emitter for zero potential. Thus, the emitter lights if there is a complete load circuit, regardless of system state. If there is a break in the load circuit, then the emitter is off. The second device is a circuit (inserted between points 3 and 4) to make the connection between R24 and L5 if the emitter is on and break the connection if the emitter is off. The third element, across points 4 and 5, is an open circuit if the emitter is on and causes L5 to flash if the emitter is off.

A key to the circuit of FIG. 8 is that elements Z7, Z8, R20 Z13, R21, Q8, Z6, Q6, Z10, R22, and RL comprise a switching power supply to provide power to lamp L5 (and any "remote" lamps) while dissipating very little power (as was described in the earlier discussion of FIG. 8, above). A switching power supply—also referred to as a "switching regulator"—is a device that efficiently converts a d.c. voltage level to another d.c. voltage level at power levels below a few kilowatts.

Figure 9:
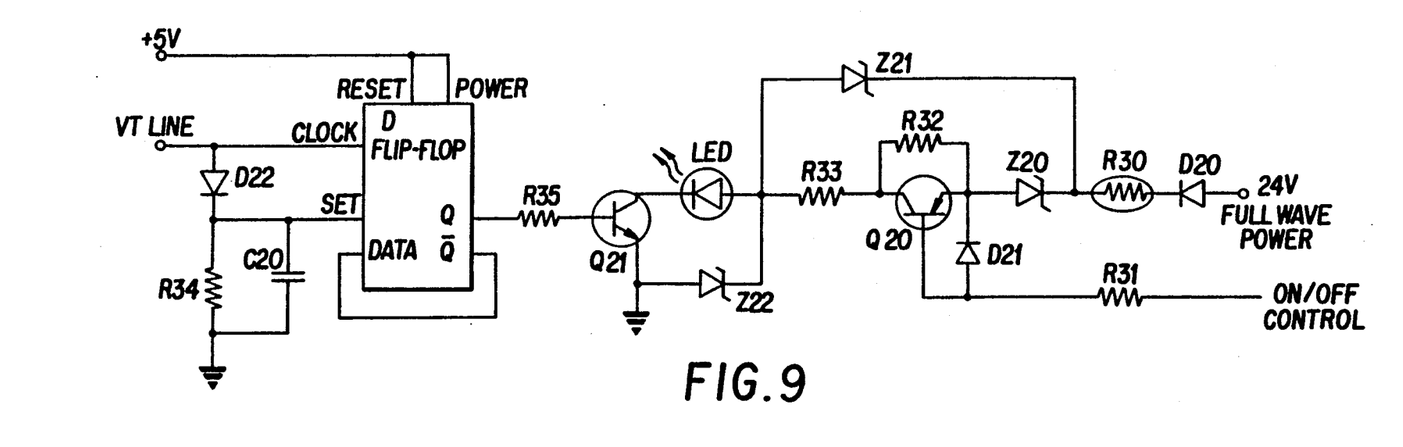
FIG. 9 depicts a circuit that provides three-mode operation of an indicator lamp.

FIG. 9 depicts a circuit that provides three-mode operation of an indicator lamp. The LED is bright when load power is on, dim when load power is off, and flashing when valid data is being received. Full-wave rectified 24 V power is introduced to the circuit through optional diode D20, which prevents damage due to miswires, and optional PTC resistor R30, which prevents damage due to miswires or overvoltage. When load power is off, a 24 V full-wave rectified control signal through base drive resistor R31 to Q20 keeps Q20 off. D21 prevents the base voltage of Q20 from rising above the emitter voltage. The current to the LED is set by R32 and R33 in series, provided Q21 is on. When load power is on, the control signal is off, Q20 is on, and the LED current is set by R33, again provided that Q21 is on. The relative brightness of the LED for power "off" and "on" is controlled by the values of R32 and R33. Typical values are R32 $\sim 40$ k$\Omega$ and R33 $\sim 1$ k$\Omega$. Optional Z21 provides overvoltage protection.

When the system is being controlled by a remote control signal, the signal is preferably encoded. If a receiver/decoder recognizes the control signal as valid, then a valid transmission signal is introduced on the valid transmission (VT) line. The signal on the VT line is normally low, but goes high for a time (typically $\sim 7$ ms) after each valid code is received, before going low again. The flip flop, together with D22, R34, and C20, assures that Q21 is on when no valid data is being received. When valid data is being received, the flip flop divides the repetition frequency of the control signal by 2 and provides a signal to Q21, through base drive resistor R35, which makes the LED "on" and "off" times equal. Z21 provides overvoltage protection and Z22 provides overload protection and LED reverse bias protection.

Since certain changes may be made in the above apparatus without departing from the scope of the inventions herein involved, it is intended that all matter contained in the above description or shown in the accompanying drawing shall be interpreted in an illustrative and not in a limiting sense.

We claim:

1. For use with means for controlling power provided by a source to an electrical load, a circuit that senses whether power to the load is on and that includes a switching power supply, driven by said source, to provide power for an indicator lamp that emits a low light intensity when the power to the load is off and higher light intensity when power to the load is on, said switching power supply comprising a solid state switch means.

2. The circuit of claim 1 in which said emitted light has a luminance of about 0.02 to about 2 footlamberts when the power is off.

3. The circuit of claim 1 in which said emitted light has a luminance of at least about 100 footlamberts when the power is on.

4. The circuit of claim 1, further comprising means for diffusing said emitted light.

5. The circuit of claim 4 in which said means for diffusing light comprises a dispersion of glass powder in epoxy placed in the light path.

6. The circuit of claim 4 in which said means for diffusing light comprises a window of sandblasted plastic placed in the light path.

7. The circuit of claim 1, further comprising means for preparing from said emitted light a collimated beam.

8. The circuit of claim 7 in which said collimating means comprises a light pipe in the light path.

9. The circuit of claim 8 in which said light pipe has a beveled end and provides output light through said beveled end.

10. The lamp of claim 1 in which said emitted light is provided by a light-emitting diode.

11. The lamp of claim 1 in which said emitted light has a maximum intensity in the range betwen about 580 nm and 650 nm.

12. A lighting control system comprising
 (a) means for controlling power provided by a source to a lighting load and
 (b) a circuit means that senses whether said power to the load is on and that includes a switching power supply driven by said source to provide current for an indicator lamp that emits a low light intensity when said power to the load is off and a higher light intensity when said power to the load is on, said switching power supply comprising a solid state first switch means.

13. The system of claim 12 in which said power control means comprises a second switch means to turn power to said load on and off.

14. The system of claim 13 in which said second switch is activatable by momentarily depressing a touch plate.

15. The system of claim 14 in which said indicator lamp is mounted to emit light through a hole in said touch plate.

16. The system of claim 12 in which said power control means comprises a plurality of auxiliary switch means for turning power to said load on and off and the system further comprises a plurality of indicator lamps, each associated with an auxiliary switch means, said indicator lamps emitting a low light intensity when said power to said load is off and a higher light intensity when said power to said load is on.

17. A system for controlling power provided by an a.c. source to an electrical load comprising, in combination,
(a) an electrically-controlled switch having an "on" position for connecting power from said a.c. source to said load and an "off" position for disconnecting power from said load and
(b) an indicator lamp means to emit
 (i) when said electrically-controlled switch is in said "on" position, a high light intensity;
 (ii) when said electrically-controlled switch is in said "off" position, a lower light intensity if there is no break in said electrical load and substantially no light if there is a break in said electrical load;
(c) drive means comprising, in combination,
 (i) a switching power supply, driven by said source, for providing a high current to said indicator lamp to emit said high light intensity and
 (ii) a resistor in series with said source and said indicator lamp for providing, alternatively, a low current signal to said indicator lamp to emit said lower light intensity; and
(d) control means connected to said electrically-controlled switch and to said switching power supply to turn them on and off in unison.

18. The control system of claim 17 further comprising a snubber connected across said electrically-controlled switch to filter transient signals.

19. The control system of claim 17 in which said electrically-controlled switch is a triac.

20. The control system of claim 17 in which said drive means further comprises a pair of diodes to limit currents through said indicator lamp to one direction.

21. The control system of claim 17 in which said control means comprises a bi-polar energy storage element and a first switch means.

22. The control system of claim 21 in which said energy storage element is a capacitor.

23. The control system of claim 21 in which said first switch means comprises a relay and a touch switch.

24. The control system of claim 22 further comprising a pair of zener diodes connected across said energy storage capacitor to protect said capacitor from over-voltage.

25. The control system of claim 23 further comprising a filter capacitor connected across a coil of said relay.

26. The control system of claim 17 in which said indicator lamp means comprises a light-emitting diode.

* * * * *